Dec. 29, 1959   R. W. JOY   2,919,087
PIPE SUPPORT
Filed Aug. 3, 1956
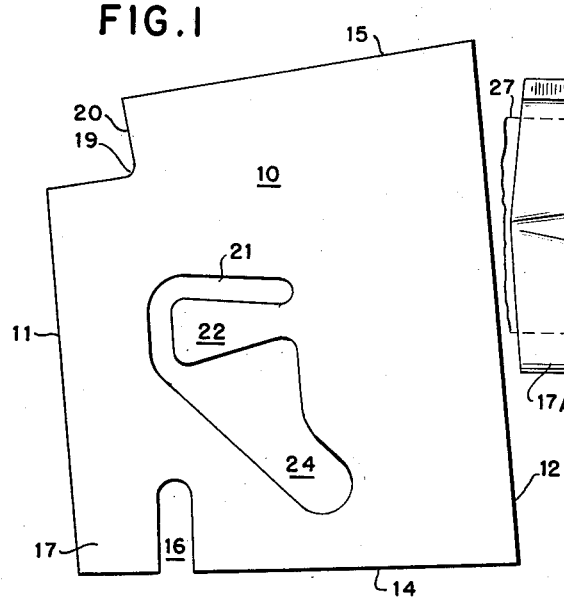
FIG.1
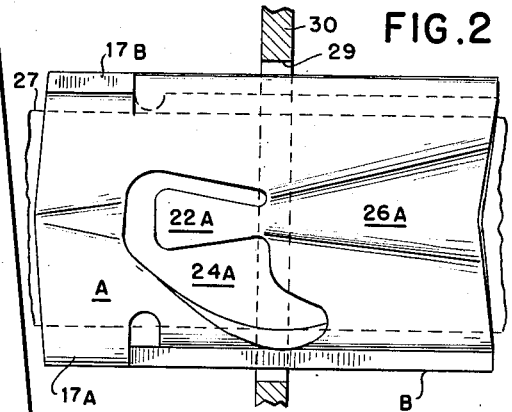
FIG.2
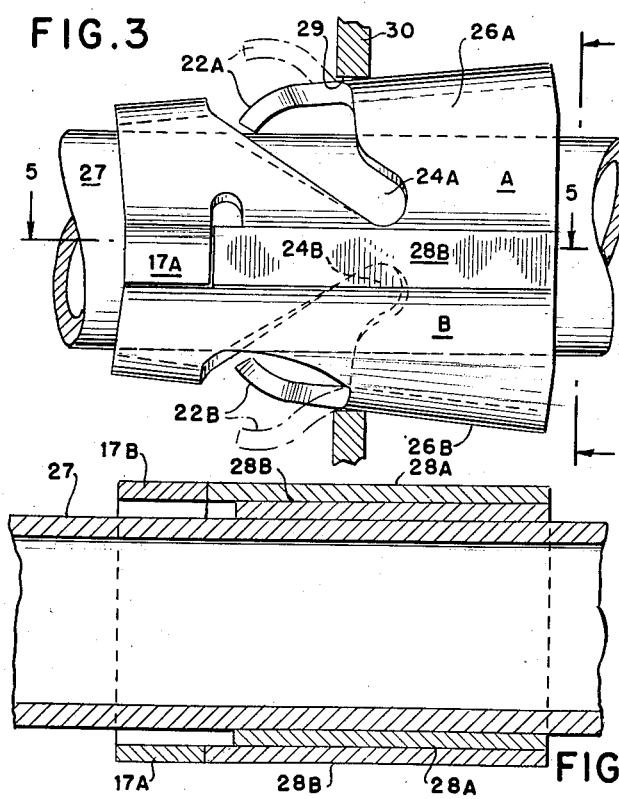
FIG.3
FIG.5
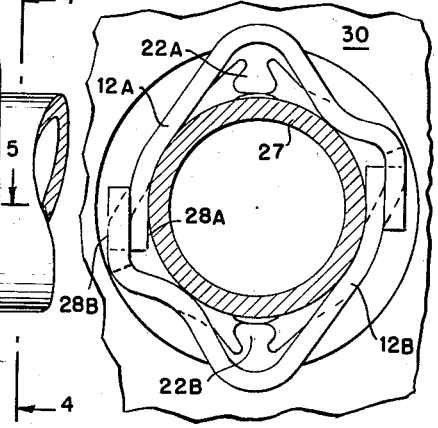
FIG.4
Robert W. Joy
INVENTOR.
BY Robert A. Shields
ATTORNEY

United States Patent Office

2,919,087
Patented Dec. 29, 1959

2,919,087

PIPE SUPPORT

Robert W. Joy, Garden City, N.Y., assignor to ACF Industries, Incorporated, New York, N.Y., a corporation of New Jersey Application August 3, 1956, Serial No. 602,034

8 Claims. (Cl. 248—56)

This invention relates to pipe supports, and, more particularly, to such devices for use in supporting the various pipes which are carried by elements of railway car framing, for example.

In the construction of railway cars it is frequently necessary or convenient to run the several required fluid conduits or pipes through certain framing elements such as cross bearers and body bolsters, or the like. For this purpose the framing elements are suitably apertured for the reception of the necessary piping. However, it has been found necessary to protect the piping against destruction by reason of the relative movement between it and the sides of the aperture due to vibration and shock. To afford such protection there have been developed various devices for the piping to the framing, and, while some of these devices have proven to be operatively successful, they have embodied certain inherent disadvantages. For example, the known pipe supports or anchoring devices consist of a plurality of parts, each having a unique shape. It is therefore necessary to maintain separate stocks of parts for repair and maintenance and since different tools are usually used in the fabrication of each type of part, the initial cost of such supports is relatively high. This fact, when considered in light of the number of supports per car, has an unfavorable effect on its overall cost.

Then too, most of the known supports are inserted in the framing aperture from one side thereof and secured in place by performing an operation, such as bending a tab or tightening a nut, from the opposite side of the aperture. Such devices are extremely difficult or impossible to employ in constructions wherein it is desired to support piping in a framing element so designed or situated that the aperture is accessible from only one side, as would be the case with a body bolster having a double diaphragm, for example.

Accordingly, it is an object of the present invention to provide an improved pipe support which is not subject to the foregoing difficulties and disadvantages.

Another object is to provide such a pipe support which may consist of two members identical in all of their essential details.

Another object is to provide such a pipe support which is relatively inexpensive to manufacture, reliable in operation and of sufficiently rugged construction to withstand the effect of usage to which it will normally be put.

A still further object is to provide such a pipe support which can be inserted and secured in an apertured framing element from one side thereof without the need of access from the other side.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a pipe support comprising a pair of essentially identical interengaging members providing a longitudinal pipe receiving passageway and arranged for securement in an apertured rigid frame element, a tapered frame element engaging hump formed in each of the members, yieldable frame element engaging tab means formed in each member, and locking means formed at one end of each of the members to prevent relative longitudinal movement therebetween. To enable the support to be employed with framing elements which are accessible from only one side, the members may be provided with a tool receiving slot disposed adjacent the tab means in a portion of the support adapted to pass through the aperture, the slot extending transversely and longitudinally of the support into the portion thereof adapted to remain on the accessible side of the framing element.

A preferred embodiment of the invention has been chosen for purposes of illustration and description, and is shown in the accompanying drawings, forming a part of the specification, wherein:

Fig. 1 is a plan view of a sheared blank from which each of the aforementioned members is formed, Fig. 2 is a fragmentary plan view of a pipe support in accordance with present invention illustrated as supporting a pipe in the aperture of a framing element, Fig. 3 is an elevational view of the device illustrated in Fig. 2 after insertion into the aperture, the tab means shown in securing position in broken lines, Fig. 4 is a sectional view taken along the line 4—4 of Fig. 3, and Fig. 5 is a sectional view taken along the lines 5—5 of Fig. 3.

Referring to the drawings in detail, and, more particularly to Fig. 1 thereof, there is shown a flat sheared blank 10 having parallel front and rear edges 11 and 12, respectively and side edges 14 and 15 which taper slightly inwardly from rear to front so as to lie in a horizontal plane after deformation of the blank as later described.

The blank 10 is formed with an open ended recess 16 therein, substantially perpendicular to the side edge 14 and adjacent the front edge 1 so as to provide a finger or flap 17, while the corner portions of the blank formed by side edge 15 and front edge 11 is cut away by a reentrant angle 19 providing a secondary front edge 20.

The blank 10 also has a generally U-shaped slot 21 therein opening towards the rear edge thereof and disposed about equidistant between the edges 14 and 15 to furnish an internal projecting tongue or tab 22. One leg of the U-shaped slot is extended into a generally diagonal slot 24 directed towards the side edge 14 and the rear edge 12 of the blank, all for a purpose to be discussed hereinafter.

After being sheared to the shape described, each blank 10 is bent or rounded to form a semi-tubular member having its major axis extending from the front edge 11 to the rear edge 12 and with straight parallel marginal edges 28. A centrally disposed tapered protuberance or hump 26 of substantially semi-conical contour is also formed therein with its divergent end or base at the rear edge 12. At the same time, the flaps 17 are bent or offset slightly outwardly.

Any two members, having been shaped and formed as described, may be employed to constitute a pipe support. As illustrated in Figs. 2 to 5, two such members, A and B, are placed in opposed juxtaposition with their respective marginal edges 28 overlapping on opposite sides of a pipe 27. The pipe passes through an aperture 29 of a framing element 30 in which it is to be supported. It will be noted that with the members A and B in this position, the flap 17 of each member abuts the secondary front edge 20 of the opposite member so that the members are locked against relative longitudinal movement.

The support is then driven into the aperture 29 until the humps 26A and 26B are wedged against the edge of the framing element 30. The tabs 22A and 22B are then bent upwardly and downwardly, respectively, as viewed in Fig. 3. It will be seen that the force of wedging the humps 26A and 26B against the framing element will develop a thrust in the side walls of the two members forcing them simultaneously against the pipe and the surface of the aperture, thereby firmly supporting the pipe in place.

Where the support is accessible from both sides of the framing element, the tabs 22 of the members A and B may be bent into element engaging position by inserting a pry bar between the tabs and the pipe 27 and bearing in a direction to bend the tabs towards the framing element. If, however, the support is accessible only from one side of the framing element, as in the case of a body bolster having a double diaphragm, the tabs are bent into place by inserting a bar into the diagonal slots 24A and 24B until the end of the bar contacts the respective tabs. A few taps with a hammer at the opposite end of the bar is then sufficient to set the tabs.

The degree of taper of the humps 26A and 26B will depend upon the size of the pipe 27 and the aperture 29 and will be selected to locate the base of tabs 22A and 22B at one side of the framing element when the humps are in wedging engagement with the other side thereof. Then too, the slots 24A and 24B will be of sufficient length to receive a tab bending tool from the divergent side of the support.

From the foregoing description, it will be seen that the present invention provides a relatively inexpensive, reliable and rugged pipe support which may be formed of two members identical in all of their essential details and which can be inserted and secured in an apertured framing element from only one side thereof when necessary without the need of access from the other side.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. A pipe support of the class described comprising a pair of essentially identical interengaging members providing a longitudinal pipe receiving passageway and arranged for partial insertion through an apertured frame element for securement therein, a tapered longitudinally extending frame element engaging hump formed in each of said members, locking means formed at one end of each of said members to prevent relative longitudinal movement therebeween, and a generally U-shaped slot in each interengaging member defining a tab therein yieldable towards the divergent end of said support to bear against the frame member.

2. A pipe support according to claim 1, wherein portions of the slot extend to each side of the frame element when the device is in operative position to permit the manipulation of the tab through the slot from either side of the frame element.

3. A pipe support of the class described comprising a pair of essentially identical interengaging members providing a longitudinal pipe receiving passageway and arranged for partial insertion through an apertured frame element for securement therein, a tapered longitudinally extending frame element engaging hump formed medially in each of said members, locking means formed in each of said members to prevent relative longitudinal movement therebetween, and a slot in each hump shaped to define a yieldable frame element engaging tab in that portion of said support arranged to pass through the frame element aperture, said slot being of such a length as to extend beyond each side of the frame element to provide for the insertion of an actuating tool for manipulating said tab.

4. A pipe clamp adapted to surround a pipe and to be driven into an opening in a support, said pipe clamp comprising a pair of tapered members of generally channel form in cross-section adapted to be associated together with their longitudinal flanges overlapping, each of said tapered members having a longitudinally extending inwardly tapered raised portion terminating in a normally inturned bendable tab for positioning engagement with the pipe associated with the pipe clamp, each of said tabs being defined by the walls of a recess formed thereabout, said recesses extending generally in the length of the pipe and being of such a length as to extend at each side of the support to be associated with the clamp to permit the insertion of an operating tool from either side of the support for manipulating the tabs away from the pipe.

5. A pipe clamp adapted to surround a pipe and to be driven into an opening in a support, said pipe clamp comprising a pair of tapered members of general channel form in cross-section adapted to be associated together with their longitudinal flanges overlapping, each of said tapered members being formed with longitudinally extending inwardly tapered raised portions for direct contact with the wall defining the opening in the support, each of said tapered raised portions of each tapered member terminating in a bendable tab adapted to be moved to a position for engaging the adjacent wall of the opening in the support, said tabs each being defined by the walls of a recess formed thereabout, and portions of said recesses being of sufficient length and extending a sufficient distance towards the outer end of the structure to provide for the insertion of a tool therethrough for manipulating the tabs from either side of said support.

6. The structure of claim 5 characterized in that one of the overlapping flanges of the tapered members at each side of the assembly is provided with an offset finger which engages in recesses in the adjacent flange.

7. A pipe clamp for positioning a pipe extending through an aperture in a support element, said clamp comprising two substantially identical tapered members of generally channel cross section and each having two longitudinal flanges, one flange of one member overlapping a flange of the other member and the other flange of the first member being overlapped by the other flange of the other member when the clamp surrounds the pipe, a portion of each overlapped flange being offset so as to extend in the plane of the overlapping flange and said overlapping flanges being recessed to receive said offset portions, said offset portions further abutting said overlapping flanges to prevent relative longitudinal movement between said members when said clamp is in operative position.

8. In a pipe clamp for positioning a pipe extending through an opening in an approximately flat support element, said clamp surrounding the pipe and extending on both sides of said element when in operative position, said clamp further being constituted of two substantially identical members each extending on one side of the pipe, the improvement comprising overlapping sides of said members, a tapering exterior surface formed in each of said members by which the clamp is wedged in said opening and forced inwardly against said pipe and by which is provided openings at the side of said tapering extension surface between the element and the clamp, a longitudinally extending bendable tab formed in at least one of said members and an access slot adjoining said tab and extending laterally therefrom, said slot further extending longitudinally through the opening and for some distance past the support element on the side thereof remote from said tab when said clamp is in operative position, thus providing access from said remote side of the support element for a tool to be inserted through said openings and under said tab to bend the same against said element.

References Cited in the file of this patent

UNITED STATES PATENTS

| | | |
|---|---|---|
| 1,757,570 | Hoerr | May 6, 1930 |
| 1,835,155 | Harbert | Dec. 8, 1931 |
| 2,452,184 | Cole | Oct. 26, 1948 |